United States Patent
Prammer et al.

(10) Patent No.: US 6,803,761 B2
(45) Date of Patent: Oct. 12, 2004

(54) TEMPERATURE COMPENSATED MAGNETIC CIRCUIT

(76) Inventors: Manfred G. Prammer, 291 Hadfield Rd., Downingtown, PA (US) 19335; Peter Masak, 47 Sheffield La., West Chester, PA (US) 19380

(*) Notice: Subject to any disclaimer, the term of this patent is extended or adjusted under 35 U.S.C. 154(b) by 0 days.

(21) Appl. No.: 10/459,693

(22) Filed: Jun. 10, 2003

(65) Prior Publication Data

US 2003/0210050 A1 Nov. 13, 2003

Related U.S. Application Data

(63) Continuation of application No. 09/739,468, filed on Dec. 18, 2000, now Pat. No. 6,577,125.

(51) Int. Cl.7 .................................................. G01V 3/00
(52) U.S. Cl. ...................... 324/303; 324/307; 324/319; 324/320
(58) Field of Search ................................ 324/300, 303, 324/307, 309, 315, 318–320, 322, 314; 335/296, 299, 302, 306

(56) References Cited

U.S. PATENT DOCUMENTS

| | | | | |
|---|---|---|---|---|
| 4,777,464 A | * | 10/1988 | Takabatashi et al. | ........ 335/306 |
| 5,400,786 A | * | 3/1995 | Allis | ........................... 600/410 |
| 5,574,417 A | * | 11/1996 | Dorri et al. | .................. 335/216 |
| 5,652,517 A | * | 7/1997 | Maki et al. | ................... 324/318 |
| 5,834,936 A | * | 11/1998 | Taicher et al. | ............... 324/303 |
| 6,111,408 A | * | 8/2000 | Blades et al. | ................ 324/303 |
| 6,111,409 A | * | 8/2000 | Edwards et al. | ............. 324/303 |
| 6,118,272 A | * | 9/2000 | Taicher et al. | ............... 324/303 |
| 6,163,154 A | * | 12/2000 | Anderson et al. | ............ 324/320 |
| 6,252,405 B1 | * | 6/2001 | Watkins et al. | .............. 324/319 |
| 6,268,726 B1 | * | 7/2001 | Prammer et al. | ............ 324/303 |
| 6,518,754 B1 | * | 2/2003 | Edwards | ...................... 324/303 |
| 6,577,125 B2 | * | 6/2003 | Prammer et al. | ............ 324/303 |

* cited by examiner

*Primary Examiner*—Diego Gutierrez
*Assistant Examiner*—Dixomara Vargas
(74) *Attorney, Agent, or Firm*—Jones Day

(57) ABSTRACT

An apparatus is disclosed for generating a magnetic field of high field strength, spatial uniformity and minimal drift of magnetic field intensity over a temperature range of about 0° C. to 175° C. This apparatus may be used in a standard modular logging tool for direct downhole NMR measurements of various parameters of fluid samples of geologic formations near the walls of a borehole. In one embodiment, the apparatus is composed of two tubular permanent magnets made of different magnetic materials with different magnetic temperature coefficients to provide temperature compensation. The apparatus preferably also utilizes a pressure barrel that surrounds the magnets and provides a return path for magnetic flux lines, thereby increasing flux density within the measurement volume.

8 Claims, 7 Drawing Sheets

TEMPERATURE COMPENSATED MAGNETIC CIRCUIT

This is a continuation of application Ser. No. 09/739,468 filed on Dec. 18, 2000, now U.S. Pat. No. 6,577,125. The contents of this prior application is incorporated herein in its entirety by reference.

FIELD OF THE INVENTION

The present invention relates to borehole measurements and more particularly to the generation of temperature-compensated magnetic fields suitable for performing downhole measurements of fluids using nuclear magnetic resonance (NMR) techniques.

BACKGROUND OF THE INVENTION

Performing measurements on fluid samples is desirable in many oil industry applications. In the prior art such measurements are typically made by bringing samples to the surface using sealed containers, and sending the samples for laboratory measurements. A number of technical and practical limitations are associated with this approach.

The main concern usually is that the sample(s) taken to the surface may not be representative of the downhole geologic formation due to the fact that only limited sample material from a limited number of downhole locations can be extracted and taken to the surface. Thus, taking samples to the surface is impractical if it is desired to measure the fluid on a dense grid of sample points. Therefore, by necessity the measurements will only provide an incomplete picture of the downhole conditions. In addition, these samples frequently contain highly flammable hydrocarbon mixtures under pressure. Depressurizing the containers frequently leads to the loss of the gas content. Handling of such test samples can be hazardous and costly. It is therefore apparent that there is a need for direct downhole fluid testing that would overcome these and other problems associated with prior art solutions.

Various methods exist for performing downhole measurements of petrophysical parameters of a geologic formation. Nuclear magnetic resonance (NMR) logging is among the most important methods that have been developed for a rapid determination of such parameters, including formation porosity, composition of the formation fluid, the quantity of movable fluid, permeability and others.

Some of the main formation parameters measured using NMR techniques include the parameter $T_1$ (known as the spin-lattice relaxation time), which corresponds to the rate at which equilibrium is established in bulk magnetization in the formation upon provision of a static magnetic field. Another related and frequently used NMR logging parameter is the spin-spin relaxation time constant $T_2$ (also known as transverse relaxation time), which is an expression of the relaxation due to non-homogeneities in the local magnetic field over the sensing volume of the logging tool. Both relaxation times provide indirect information about the formation porosity, the composition and quantity of the formation fluid, and others.

Another measurement parameter used in NMR well logging is the formation diffusion, which generally, refers to the motion of atoms in a gaseous or liquid state due to their thermal energy. It is well known that a correct interpretation of the NMR measurement parameters $T_1$, $T_2$ and diffusivity may provide valuable information relating to the types of fluids involved, the structure of the formation and other well logging parameters of interest. The accuracy of the measurements, and thus the validity of the derived information, depends on a number of factors, including the ability of the measurement tool to provide consistent measurement results over a wide range of practical conditions, such as the operating temperature.

NMR measurements of geologic formations may be done using, for example, the centralized MRIL® tool made by NUMAR, a Halliburton company, and the side-wall CMR tool made by Schlumberger. The MRIL® tool is described, for example, in U.S. Pat. No. 4,710,713 to Taicher et al. and in various other publications including: "Spin Echo Magnetic Resonance Logging: Porosity and Free Fluid Index Determination," by Miller, Paltiel, Millen, Granot and Bouton, SPE 20561, 65th Annual Technical Conference of the SPE, New Orleans, La., Sep. 23–26, 1990; "Improved Log Quality With a Dual-Frequency Pulsed NMR Tool," by Chandler, Drack, Miller and Prammer, SPE 28365, 69th Annual Technical Conference of the SPE, New Orleans, La., Sep. 25–28, 1994). Details of the structure of the MRIL® tool and the measurement techniques it uses are also discussed in U.S. Pat. Nos. 4,717,876; 4,717,877; 4,717,878; 5,212,447; 5,280,243; 5,309,098; 5,412,320; 5,517,115; 5,557,200; 5,696,448; 5,936,405; 6,005,389; 6,023,164; 6,051,973; 6,107,796 and 6,111,408, all of which are commonly owned by the assignee of the present application. The Schlumberger CMR tool is described, for example, in U.S. Pat. Nos. 5,055,787 and 5,055,788 to Kleinberg et al. and further in "Novel NMR Apparatus for Investigating an External Sample," by Kleinberg, Sezginer and Griffin, J. Magn. Reson. 97, 466–485, 1992. The content of the above patents and publications is hereby expressly incorporated by reference for background.

Wireline logging of boreholes performed using the NMR tools described above or other techniques known in the art provides valuable information concerning the petrophysical properties of the formation and, in particular, regarding the fluid composition of the formation. However, additional fluid parameter information can be critical for the interpretation of the wireline NMR measurements. For example, it is often desirable to distinguish between water, connate oil, drilling mud filtrates and gas based on the differences in $T_1$, $T_2$ and diffusivity. The true values for connate oil and the drilling mud filtrates under reservoir conditions are often unknown and must be approximated from laboratory measurements done under different conditions. Therefore, for increased accuracy, it is desirable to perform real-time downhole NMR determination of the $T_1$, $T_2$ and diffusivity parameters of borehole fluids to enhance the quality and reliability of the formation evaluation obtained using the standard measurements.

Direct downhole measurements of certain fluid properties are known in the art. Several commercially available tools may be used to this end. Examples include the RDT tool manufactured by Halliburton, the Reservoir Characterization Instrument (RCI) from Western Atlas, and the Modular Formation Dynamics Tester (MDT) made by Schlumberger. These tester tools have modular design that allows them to be reconfigured at the well site. Typically, these tools provide pressure-volume measurements, which may be used to differentiate liquids from gases, and which are also capable of providing temperature, resistivity and other mechanical or electrical measurements. However, none of these tools is presently capable of providing NMR measurements, such hydrogen density, self diffusivity, or relaxation times.

A tester capable of performing direct downhole NMR measurements that can be used to enhance the quality and reliability of formation evaluation and that can provide a modular NMR downhole tester as an add-on to existing testing equipment to minimize the cost of extra measurement is disclosed in U.S. Pat. No. 6,111,408, entitled "Nuclear Magnetic Resonance Sensing Apparatus and Techniques For Downhole Measurements" by the present inventors.

The ability of such a tester to perform rapid and accurate NMR measurements is critically dependent on the ability to produce an intense and uniform magnetic field in the test vessel containing the fluids of interest. A downhole tester, such as that disclosed in U.S. Pat. No. 6,111,408, is exposed to extreme changes of temperature and the magnetic field generated in the test vessel of such a downhole tester must show little drift with temperature and should not be influenced by external fields and materials.

Therefore, there is a need for an apparatus for the generation of a magnetic field in a test vessel of a downhole tester, which is able to generate a static magnetic field of high field strength, spatial uniformity and minimal drift over a wide temperature range suitable for practical applications, e.g., 0° C. to 175° C. In addition, there is a need for an apparatus, the magnetic field of which is largely confined to an interior volume of the test vessel, so that the influence of external fields and materials is minimized or eliminated.

SUMMARY OF THE INVENTION

Described herein is an apparatus for the generation of a spatially uniform and temperature compensated magnetic field, within a given volume for use with nuclear magnetic resonance (NMR) techniques. In particular, an apparatus for generating a magnetic field suitable for a modular NMR tester capable of making direct downhole NMR measurements of various parameters of fluid samples of geologic formations near the walls of a borehole is provided. The modular tester is preferably incorporated as an add-on part to a standard commercial downhole formation tester.

In operation, test fluids located proximate to the borehole are introduced into a test chamber of the tester. In a preferred embodiment, the tester comprises a vessel made of a non-conductive material and a surrounding permanent magnet that creates a uniform, static, temperature-compensated magnetic field within the test chamber. In a preferred embodiment, a radio frequency (RF) coil is embedded in the walls of the vessel and is used to induce an excitation field with a direction perpendicular to the static magnetic field. NMR signals from the excited nuclei in the fluids are detected to obtain data for directly estimating a number of fluid parameters, or to assist in the interpretation of wireline MRIL measurements.

More specifically, in a preferred embodiment, an apparatus is provided for generating a uniform, temperature-compensated magnetic field suitable for use in a downhole NMR tester such as that disclosed in U.S. Pat. No. 6,111,408 to the present inventors, which is hereby incorporated by reference for all purposes. According to one embodiment, the apparatus comprises: a first magnet having longitudinal axis, magnetized in a direction that is perpendicular to the longitudinal axis; and at least a second magnet also in the form of a tube that is co-axial with and is within the first magnet tube. The second magnet is also magnetized in a direction that is perpendicular to its longitudinal axis and at some angle, preferably 0° or 180°, to the magnetization direction of the first magnet.

In one aspect of the invention, the first and second magnets are composed of materials having different magnetic temperature coefficients and therefore the combined magnetic field within the internal volume of the magnets will vary less with temperature than the field within a comparable magnet assembly having just one type of magnetic material.

In another aspect of the invention, the apparatus further comprises a tubular pressure barrel co-axial with and containing both the first and second magnets. In a preferred embodiment, the pressure barrel is made of metal with a high relative magnetic permeability, such as soft-iron or low-carbon steel, and thus provides a low resistance path for magnetic field lines outside the magnets. This return path for the magnetic flux increases the magnetic flux density within the interior volume of the magnets.

In addition, in a preferred embodiment of the apparatus, the cross-sectional area of the first magnet and the cross-sectional area of the second magnet are selected in a ratio proportional to the ratio of the inverse of their respective temperature coefficients to enhance the temperature compensation effect. Alternatively or in addition, the degrees of magnetization of the two magnets may be selected in accordance with their respective temperature coefficients.

In one embodiment, the two magnets have different magnetic temperature coefficients with the same sign, and the angle between the direction of magnetization of the first magnet and that of the second magnet is approximately 180°. In another embodiment, the two magnets have different magnetic temperature coefficients with opposite signs, and the angle between the direction of magnetization of the first magnet and that of the second magnet is approximately 0°.

In particular, in accordance with the present invention is provided an apparatus for generating a temperature-stabilized magnetic field for conducting nuclear magnetic resonance (NMR) measurements, the apparatus comprising: a first magnet that generates a first magnetic field B1 in a test region, wherein the first magnetic field has a component B1z in a direction z, which component increases with increasing temperature; and a second magnet that generates a second magnetic field B2 in the test region, wherein the second magnetic field has a component B2z in the direction z, which component decreases with increasing temperature.

In another aspect, an apparatus for generating a temperature-stabilized magnetic field is provided for conducting NMR measurements, the apparatus comprising: a first magnet with a first magnetization in a direction z; and a second magnet with a second magnetization in the direction −z; wherein the first and second magnets have magnetic temperature coefficients of the same sign. In an alternative embodiment, an apparatus for generating a temperature-stabilized magnetic field is provided for conducting NMR measurements, the apparatus comprising: a first magnet with a first magnetization in a direction z; and a second magnet with a second magnetization in the direction z; wherein the first and second magnets have magnetic temperature coefficients of opposite signs.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENTS

Figure 1:
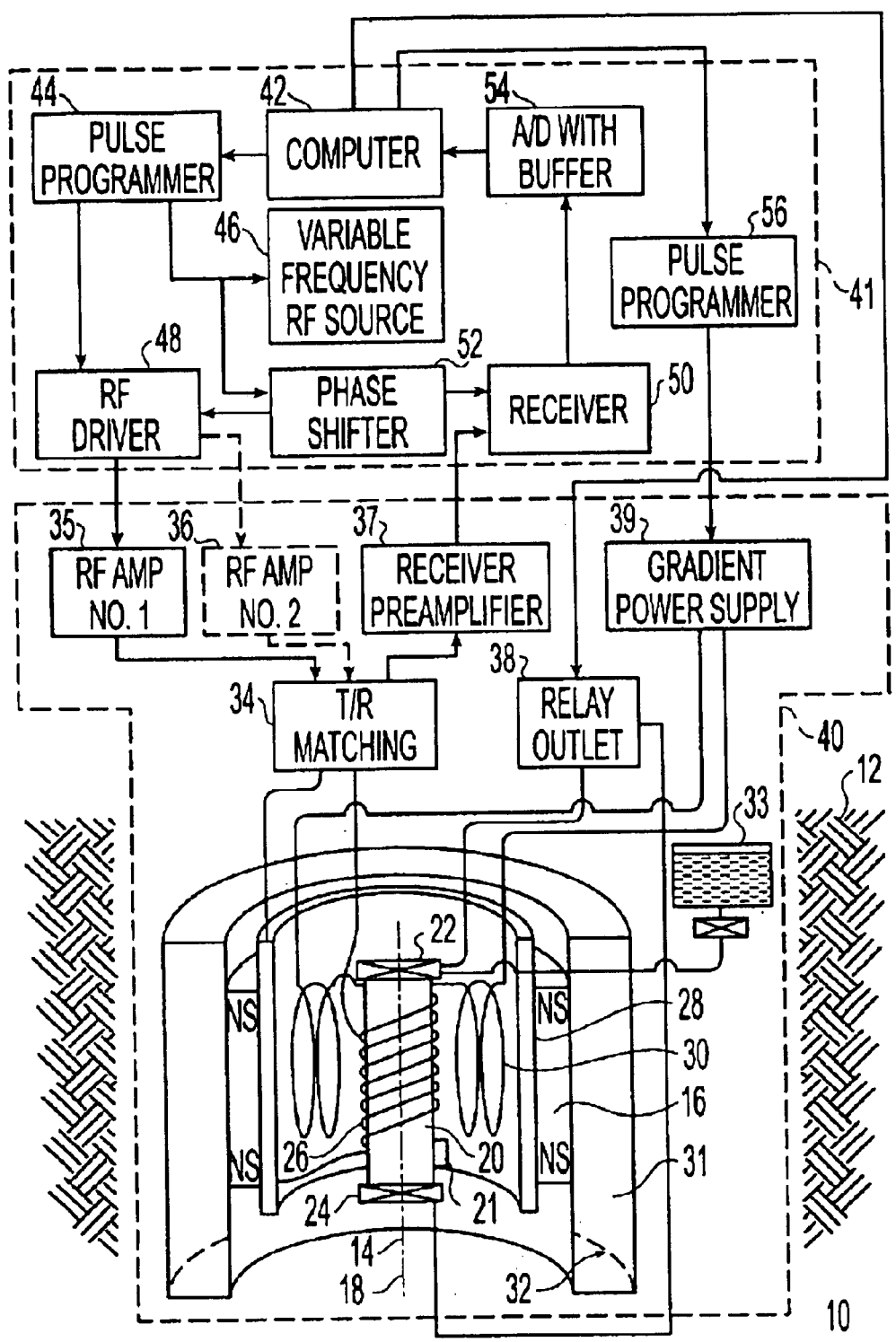
FIG. 1 is a partially pictorial, partially block diagram illustration of one embodiment of a modular fluid testing apparatus for obtaining nuclear magnetic resonance measurements of fluids near a geologic structure.
Figure 6:
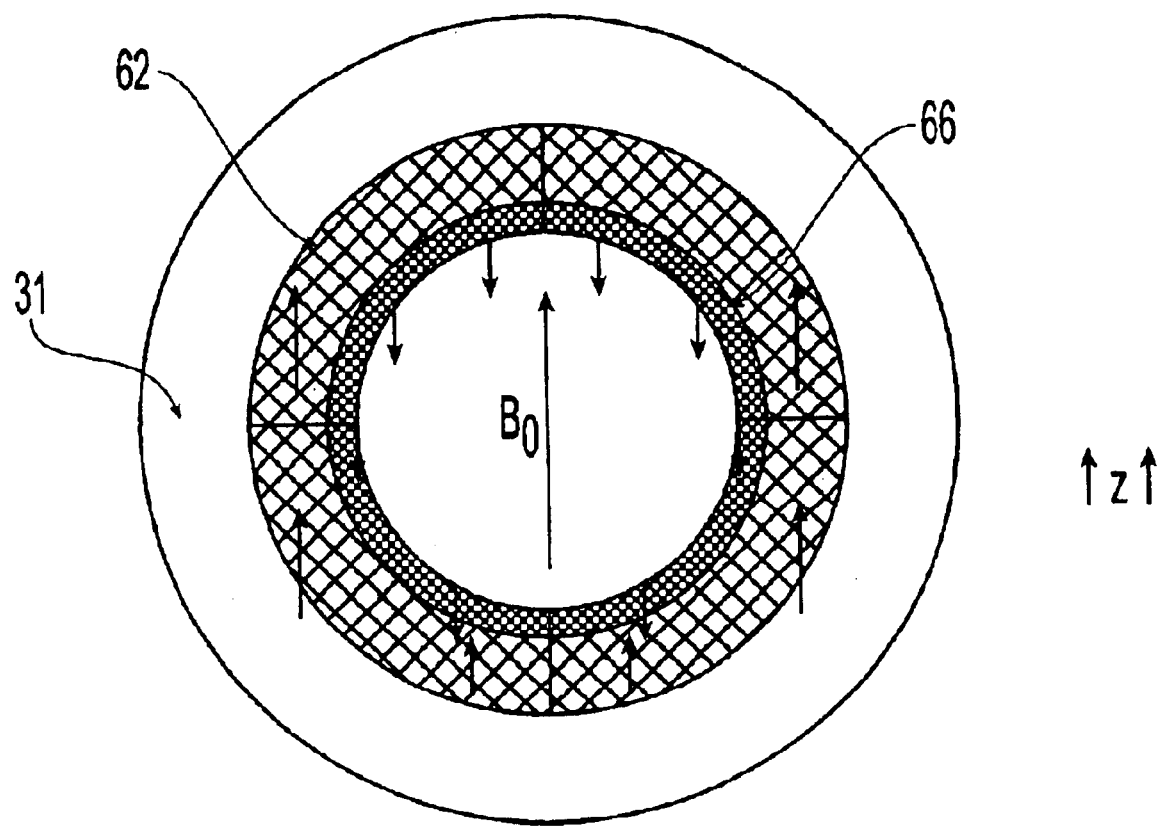
FIG. 6 is a cross-section of one embodiment of the permanent magnets and pressure barrel used in accordance with the present invention to generate a uniform, temperature compensated magnetic field.

Reference is first made to FIG. 6, which illustrates a cross-section of one arrangement of magnets and a pressure barrel used in accordance with the present invention to provide a temperature-compensated magnetic field for NMR measurements. This arrangement can be used in a sensing system, such as the type shown in FIG. 1 by way of example. FIG. 1 is a partially pictorial, partially block diagram illustration of one embodiment of a modular fluid testing apparatus for NMR analyses and is described in detail in U.S. Pat. No. 6,111,408 to the present inventors. The cross-section in FIG. 6, for simplicity, omits external components, such as the coil windings and shield and illustrates only the magnets, 62 and 66, and the soft-iron vessel 31.

Figure 3:
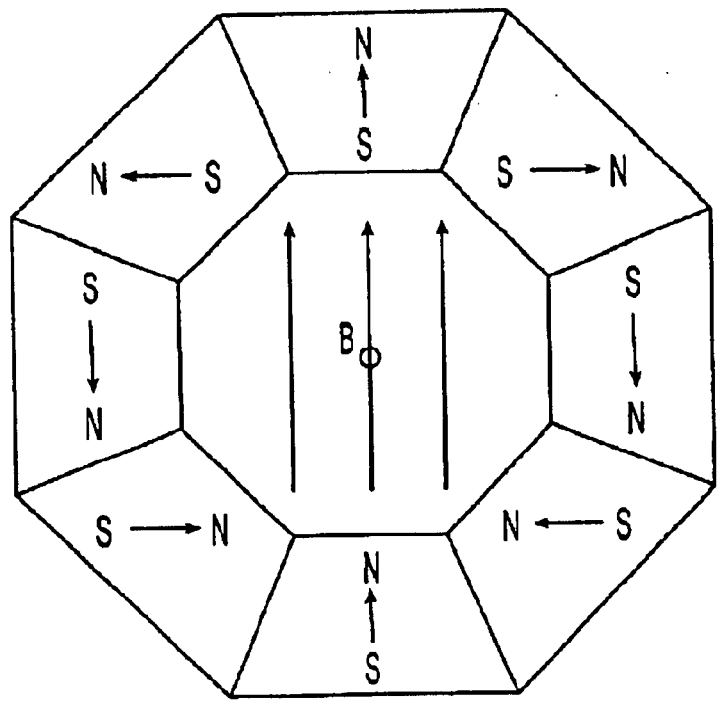
FIG. 3 is an illustration of the configuration of a permanent magnet arrangement described in U.S. Pat. No. 6,111,408.

The magnet configuration described in U.S. Pat. No. 6,111,408 is illustrated further in FIG. 3. It is constructed of samarium-cobalt segments configured, as shown, as a Halbach magnet. The construction of such magnet configuration is disclosed, for example, in U.S. Pat. No. 4,931,760 for use in medical imaging application. As FIG. 3 shows, this magnet configuration is formed by eight longitudinal segments with varying directions of magnetization, joined to form an elongated eight-sided structure. This magnet configuration generally does not provide temperature compensation, and has no external low-resistance path for the magnetic flux.

In a preferred embodiment of this invention, the magnet section 16 in FIG. 1, comprises two concentric tubular magnets, as illustrated in FIG. 6 in cross-section. In one embodiment, the direction of magnetization of these tubular magnets is uniform around their circumference, as shown by the arrows in FIG. 6. The length of the permanent magnet is generally determined by design constraints. It will be appreciated that this length affects the signal-to-noise ratio (SNR) of the measured signals, with longer magnets generally resulting in improved SNR.

In the embodiment illustrated in FIG. 6, segments of permanent magnet material are arranged around a cylindrical interior volume. In contrast to the Halbach configuration shown in FIG. 3, all magnet segments in the sensing system are preferably magnetized in substantially the same direction. This direction is perpendicular to the longitudinal axis of the resulting cylinder. The segments are joined together to form a cylinder 62 within which a homogeneous, transverse magnetic field $B_0$ is generated, having a substantially uniform direction z. In accordance with the invention, the number of segments joined is not critical and is determined by design constraints. In a preferred embodiment, eight segments are joined to form a tube or cylinder. Advantageously, the resulting cylinder could be magnetized after assembly, which makes the magnet configuration simpler to manufacture.

It will further be appreciated that the strength of the magnetic field $B_0$ in the illustrated configuration may be varied for different designs. In a preferred embodiment, a transverse field $B_0$ of approximately 1000 Gauss may be generated by use of eight samarium-cobalt or other rare-earth material magnet segments, each magnetized to about 10,000 Gauss and joined to form a cylinder with inside diameter of 1.59 inches and outside diameter of 1.87 inches.

In accordance with the invention, a second cylindrical or tubular permanent magnet 66 is employed to at least partially compensate for the temperature-dependent properties of the first magnet element 62. In one embodiment of the sensing apparatus, this second magnet has the same longitudinal axis as the first magnet. The second magnet may also be constructed of segments joined to form a tube or cylinder 66. In one embodiment shown in FIG. 6 this second magnet is enclosed within the first magnet. In another embodiment the second magnet may be positioned outside of the first magnet. This second magnet is made in accordance with the invention of magnetic material that has a temperature coefficient different from that of the first magnet. The segments of the second magnet are all magnetized in the same direction, which is substantially perpendicular to the longitudinal axis of the cylinder comprising the second magnet. The angle between the direction of magnetization of the first magnet and the second magnet may vary in different embodiments of the apparatus. It will be appreciated that the degree of temperature-compensation will also vary depending on this angle. In a preferred embodiment shown in FIG. 6, this angle is approximately 180 degrees, which maximizes the temperature compensation effect.

As indicated above, the first and second magnets may be made of a variety of materials. For example, the materials used may both exhibit negative magnetic temperature coefficients. However, the temperature coefficients of the two materials used must differ in order to produce temperature compensation of the magnetic field $B_0$. In one embodiment, the first magnet 62 is made of samarium-cobalt (SmCo) alloy and the second magnet 66 is made of neodymium-iron-boron (NeFeB). In another embodiment the first magnet could be made of NeFeB and the second magnet of SmCo. Other magnetic materials could be used in combination with either SmCo or NeFeB, for example, barium-ferrite or other rare-earth composites.

The cross-sectional areas of the first magnet 62 and the second magnet 66 may vary in different embodiments of the magnetic assembly. In a preferred embodiment the cross-sections are chosen to have a ratio that is proportional to the ratio of the inverse of the respective temperature coefficients of the material from which the magnets are made. For example, if one magnet is constructed of samarium-cobalt with a temperature coefficient of $-0.03\%/K$ and the other magnet is constructed of neodymium-iron-boron with a temperature coefficient of $-0.12\%/K$ then the ratios of cross-sectional areas in a preferred embodiment would be 4:1. In this ratio, the temperature drifts of the two magnets used in accordance with this invention would have the greatest tendency to cancel each other out.

It should be noted that the magnetic components and field strength are not limited to the materials and strength mentioned. Other materials and design parameters may be employed as appropriate for particular operational constraints, as would be known to one skilled in the art of NMR magnet design.

With reference to FIG. 6, the co-axial first magnet 62 and second magnet 66 are surrounded by a tubular pressure barrel 31 that is co-axial with the first and second magnets. This pressure barrel extends the length of first and second magnets and is constructed of a material that has high relative magnetic permeability, so as to provide a low resistance return path for the magnetic flux lines outside of the magnets. It will be appreciated that the composition and relative permeability of the pressure barrel may vary.

In a preferred embodiment, the barrel is made of low-carbon steel with a relative permeability of approximately 1000. In one embodiment, the barrel is made with 1018 low-carbon steel. The dimensions of the barrel are not critical and are determined from design constraints of the logging tool housing the NMR tester. In a preferred embodiment, the inside diameter of the barrel 64 is approximately 2.25 inches and the outside diameter is approximately 3.00 inches. Generally, it is required that the material of which the barrel is made be capable of withstanding the temperature and pressure conditions in a typical borehole environment. In a preferred embodiment the pressure barrel is able to withstand high internal pressure, so as to provide support for the pressure vessel, shown as element 20 in FIG. 1, which contains the fluid sample to be tested.

Figure 7:
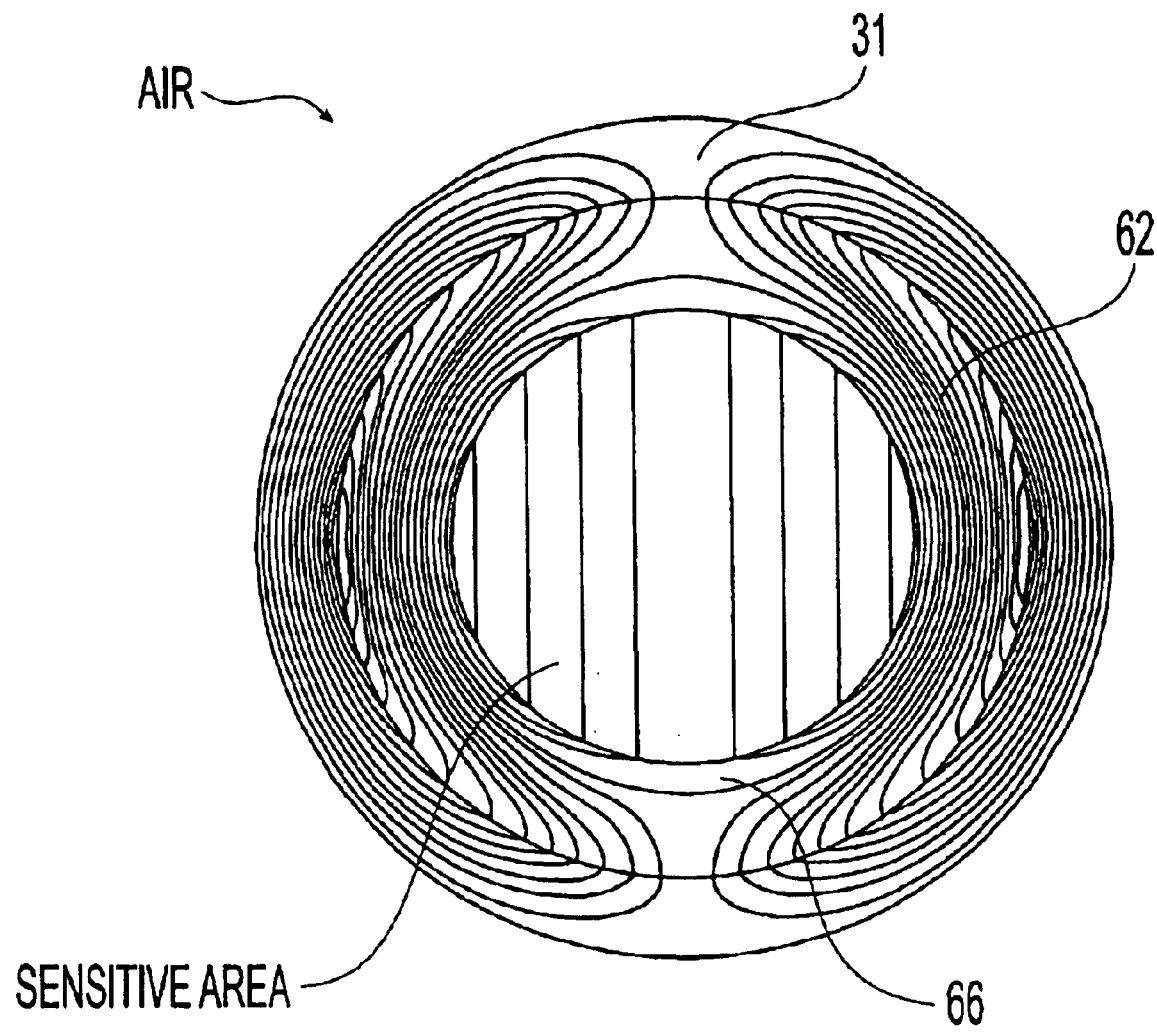
FIG. 7 is a cross-sectional view showing the flux line computation for one embodiment of the present invention using a ring magnet with external steel ring.
Figure 8:
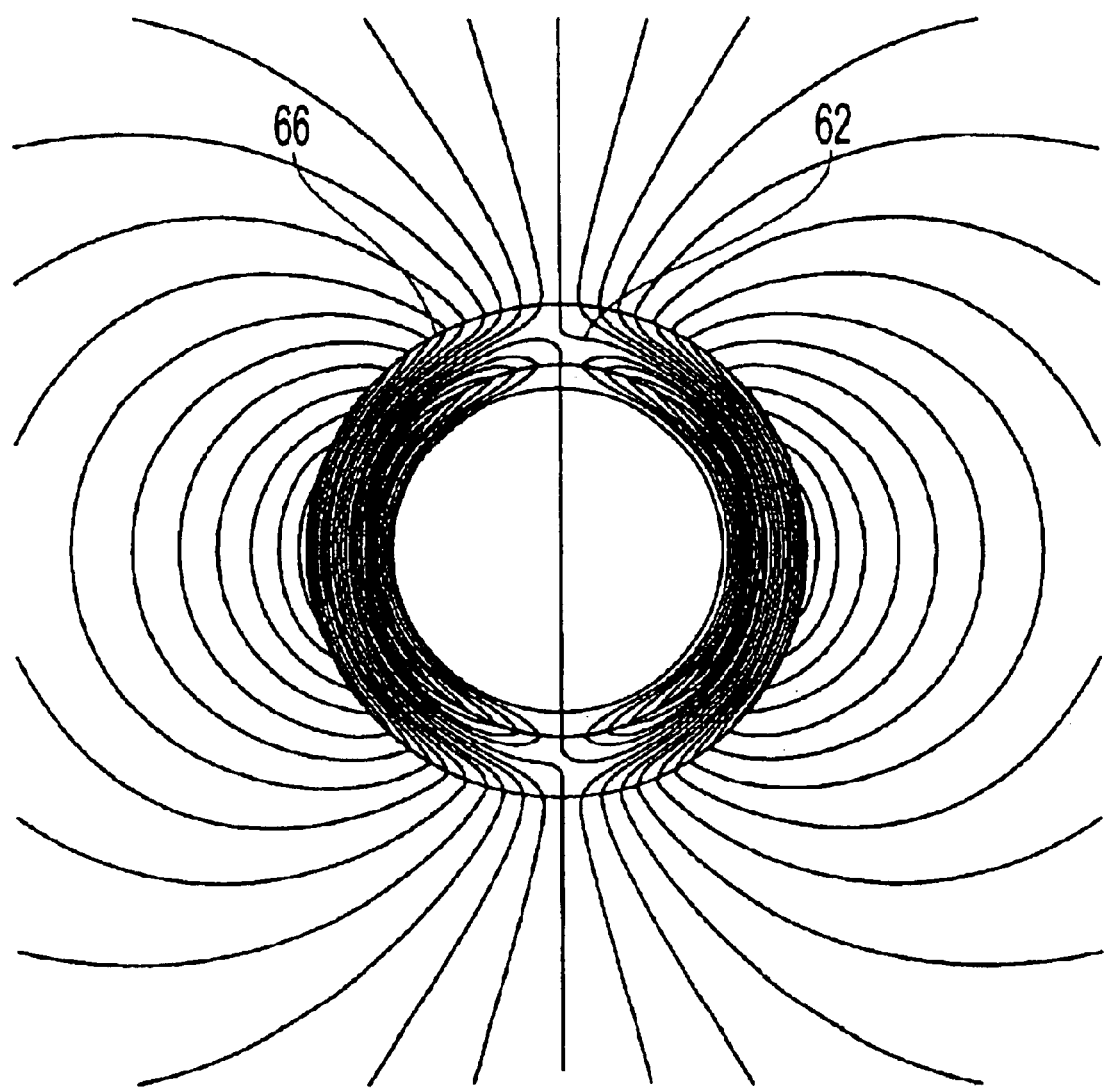
FIG. 8 is a cross-sectional view of the ring magnet in FIG. 7 showing the effect on the flux lines of removing the steel ring.

In addition to providing support for the pressure vessel, the pressure barrel can increase the homogeneity and flux density of the magnetic field within the interior of the tubular magnets by providing close return path for the external magnetic flux. FIG. 7 shows the calculated flux density for a ring magnet with an external steel ring. FIG. 8 shows the effect of removing the steel ring. Comparing the two figures shows that without the external return path for the magnetic flux lines the flux density inside the ring magnet decreases substantially. It will be apparent that the increased flux density and homogeneity of the internal magnetic field may improve the signal-to-noise ratio of the NMR measurements made with the magnetic field generating apparatus. In addition, using a pressure barrel in accordance with this invention is more efficient in the sense that it allows the system to achieve a higher internal flux density for a given volume of magnetic material.

Located within the permanent magnet (shown as 16 in FIG. 1) is pressure vessel 20 having a test chamber therein for holding fluid samples. As shown in the figure, pressure vessel 20 has a longitudinal axis 14 that is coaxial with longitudinal axis 18 of the permanent magnet. Pressure vessel 20 is preferably fabricated of non-conductive materials such as ceramics, or preferably fiberglass. Generally, it is required that the material of which the vessel is made be capable of withstanding the temperature and pressure conditions in a typical borehole environment. The dimensions of the vessel are not critical and are determined from design constraints of the logging tool housing the modular NMR tester. In a preferred embodiment, the inside diameter of the vessel 20 is approximately 1 cm and the test chamber is approximately 15 cm long, so that the vessel is capable of holding a sample volume of approximately 10 cm$^3$. Different holding volumes may be used, as required.

Vessel 20 is adapted to receive and discharge fluids and to this end is connected by inlet valve 22 and outlet valve 24 to external pressure tubes (not shown) that form part of the logging tool and are typically made of steel. Valves 22 and 24 are operated to allow fluid samples to enter the instrument from one end, preferably from the top in order to use the force of gravity, hold samples for the duration of the NMR measurements and to discharge samples from the other end after completion of the NMR measurement cycle.

The external equipment required to supply the borehole fluids to be tested to the pressure vessel 20 is generally known to one skilled in the art of downhole well logging. In the simplest case, it comprises a pressure probe that is hydraulically activated from within a module that isolates the borehole pressure from the probe. The probe penetrates the mud in the borehole and is inserted into the rock at a desired location in the sidewall of the borehole. Generally, the invading fluid in the borehole is sealed off, so that preferably only native fluid from the rock is pumped into the tester. At least a portion of this fluid is preferably diverted through valve 22 into the test chamber of the NMR tester described herein. For a more detailed description of the external equipment the reader is directed to the product literature concerning the commercially available logging tools, such as those manufactured by Halliburton, Schlumberger and Western Atlas.

In alternative embodiments (not shown) vessel 20 need not be closed as illustrated in FIG. 1, so that one or both of valves 22 and 24 may be eliminated. Thus, in a specific embodiment vessel 20 is merely a portion of a duct in which fluid to be tested may flow continuously. In such case, measurements are taken on the volume of fluid surrounded by the permanent magnet at the time of the NMR experiment (the test volume). In an alternative embodiment, vessel 20 only has one closed end illustrated in FIG. 1, for example, by valve 24. In this case, the flow of the fluid may be interrupted during measurements by closing off valve 24, and may resume by opening the valve on command by a computer 42. In each case, provisions may be made to expel fluids from the test volume by various means, as known in the art. Finally, control of the fluid flow may be implemented using the external equipment. It should thus be understood that the vessel 20 may be either a closed container or a duct or an arrangement that enables controlled flow of fluid through the volume surrounded by the permanent magnet.

Test portion 10 of the testing apparatus also preferably comprises one or more coil windings 26 that are arranged around vessel 20. Since it is important to have the coil windings 26 as close to the fluid sample as possible for the NMR measurements performed using this device, in a preferred embodiment windings 26 are embedded in the walls of pressure vessel 20. In operation, coil 26 generates a magnetic field $B_1$ (not shown) to excite nuclear magnetic relaxation in the test fluid and then receives NMR signals from the fluid samples contained within vessel 20. The magnetic field $B_1$ is polarized in a direction parallel to the longitudinal axis 18 of the permanent magnet 16, and thus is perpendicular to the direction of the magnetic field $B_0$. In a preferred embodiment, the $B_1$ field is operated at a frequency that may be varied in accordance with the strength of the $B_0$ field. As known in the art, the required operating frequency of the magnetic field is given by the expression $F_1 = 42{,}580 \text{ Hz/mT} \times B_0$, where 42,580 Hz/mT is the gyromagnetic ratio for hydrogen NMR. In a specific illustrative embodiment where $B_0$ is 47 milli Tesla (mT), $B_1$ is operated at approximately 2 MHZ. It should be noted that in a preferred embodiment the matching and tuning circuit for the coil 26 enable single-tuning, i.e., for hydrogen frequency only, or multiple-tuning for NMR measurements of additional elements, such as the $^{13}$C isotope. This feature is based on the fact that a given magnetic field requires different operating frequencies for different atomic isotopes.

With reference to FIG. 1, the return path of the coil current is provided through a copper shield 28 that separates the interior, radio frequency section of test portion 10 from the permanent magnet. Accordingly, the magnetic field lines of $B_1$ do not penetrate the permanent magnet and cannot excite undesirable magneto-acoustic oscillations.

In the embodiment illustrated in FIG. 1, one or more magnetic field gradient coils 30 are located between coil windings 26 and copper shield 28 to generate a magnetic field gradient. The gradient coil 30 is essential for performing rapid, high-SNR self diffusion measurements. In a preferred embodiment, coil 30 is of a saddle type with two separate loops generating fields in the x direction. In a preferred embodiment, saddle coil 30 is driven as a Maxwell pair such that the gradient field enhances the uniform field $B_0$ in the positive x direction and opposes it in the negative x direction, thereby creating a steerable field gradient $dB_0/dx$.

The coil windings 26, together with a (T/R) matching circuit 34 shown in FIG. 1 define a transmitter/receiver (T/R) circuit required for the NMR measurements. T/R matching circuit 34 typically includes a resonance capacitor, a T/R switch and both to-transmitter and to-receiver matching circuitry. Circuit 34 is coupled to a first RF power amplifier 35 and optionally to a second RF amplifier 36 and to a receiver preamplifier 37. A relay outlet 38 is linked to valves 22 and 24. A power supply 39 provides the dc current required for the magnetic field gradient generating coil(s) 30.

The coil 26 shown in FIG. 1 is of a solenoid type. In an alternative embodiment (not shown), coil 26 may be of a saddle type. In this case, with reference to FIG. 1, some of the windings of the coil would face away from the drawing sheet as to generate a magnetic field with the appropriate direction.

In another embodiment of the antenna (not shown), two separate coils are used—one as a transmitter and the other as a receiver antenna. In such a case, one of the coils is preferably of a solenoid type (as shown in FIG. 1) whereas the other is preferably of a saddle type. The solenoid type coil is preferably used as a receiving antenna and is preferably embedded in the walls of the vessel as to increase its sensitivity. The saddle type coil is used in this case as a transmitter, and is located further away from the axis of the vessel compared with the receiver. Alternatively, the saddle type coil may be used a receiver and the solenoid coil as a transmitter. An advantage of having two antennae is that in such case there is no need for a T/R matching circuit 34, so that the transmitter antenna may be connected directly to RF amplifier 35, whereas the receiver antenna may be connected directly to preamplifier 37.

The calibration of the testing apparatus is preferably accomplished using calibration fluid. As shown in a specific embodiment in FIG. 1, a reservoir tank 33 holding calibration fluid, such as distilled water, may be located proximate the pressure barrel 31. In a preferred embodiment, the water may be doped with cupric sulfate to lower the NMR relaxation times to approximately 200 milliseconds at reservoir temperatures. The vessel 20 may be filled with approximately 10 $cm^3$ fluid at a time from the reservoir tank 33. Since the hydrogen content and the self-diffusion coefficient of distilled water as a function of temperature are known, measurements on the water sample serve as tool calibrations under actual temperature and pressure conditions. The artificially lowered relaxation times, $T_1$ and $T_2$, permit rapid pulsing and therefore fast acquisition of NMR signals.

Temperature measurements are preferably made using a transducer 21, as shown in FIG. 1. In alternative embodiments of the operation, calibration fluid is used to fill the vessel 20 prior to lowering the device in the borehole, so that there is no need for a separate reservoir tank.

In a specific embodiment, all of the elements described above are contained in a housing 40, which in operation forms part, i.e., an add-on, of a larger logging tool and is passed along with the tool through the borehole. In alternative embodiments some of the elements illustrated in FIG. 1 as part of the housing 40 may be located above ground.

Block 41 in FIG. 1 is a block diagram of one embodiment of the control circuitry for the downhole NMR tester. As shown, the control circuitry may comprise a computer 48 that provides a control output to a pulse programmer 44. Pulse programmer 44 is responsible for generating NMR pulse sequences of predetermined frequency, phase shift and duration. To this end, pulse programmer 44 controls the operation of a variable frequency RF source 46 and phase shifter 52, as well as an RF pre-amplifier 48. The pulsed RF output of pre-amplifier 42 which has the appropriate frequency and phase shift is supplied to RF power amplifier 35 and optionally to RF amplifier 36. The output of amplifier 35 (and/or 36) is finally passed through T/R matching circuit 34 to coil 26, which generates the magnetic field $B_1$ to excite nuclei in the fluid being tested.

NMR echo signals generated from the excited nuclei in the fluid contained in the test chamber are picked up by the coil 26 and passed through the T/R matching circuit 34 to receiver pre-amplifier 37. The output of RF receiver preamplifier 37 is supplied to an RF receiver 50, which preferably also receives an input from phase shifter 52. The output of receiver 50 is provided via an A/D converter with a buffer 54 to computer 42 for further processing and analysis of the NMR echo signals. Pulse programmer 56 controls the gradient coil power supply 39 controlling the current flow, and hence the generation of field gradients, according to the commands of the computer 42.

Control circuits for generating pulse sequences having predetermined parameters and for measuring NMR echo signals from test materials and their operation are generally known in the art and need not be described in detail. Therefore, it should be understood that the configuration shown in FIG. 1 is only illustrative and may be varied in alternative embodiments of the control system.

Figures 2A, 2B, 2C, 2D:
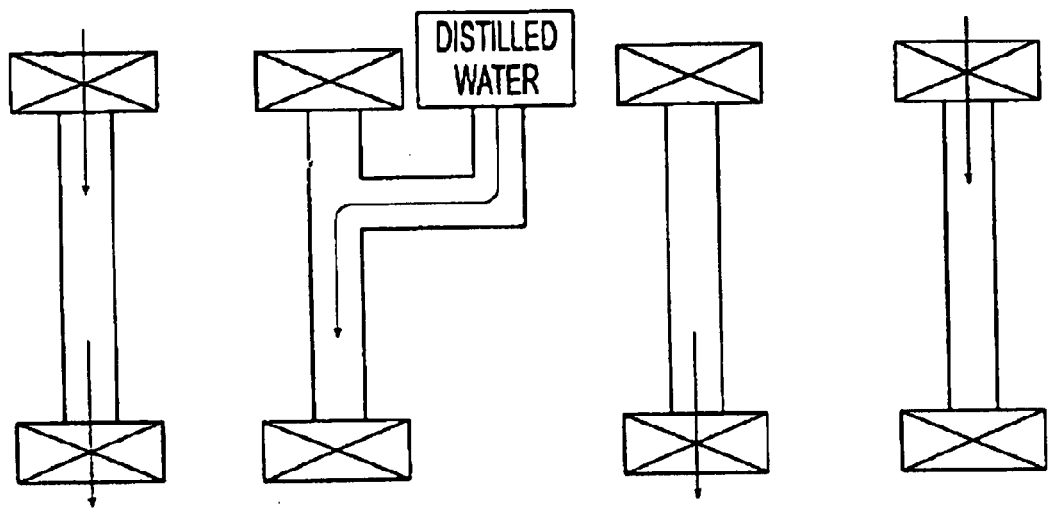
FIGS. 2A through 2D depict one embodiment the steps involved in measuring fluids using the modular NMR testing apparatus.

Reference is now made to FIGS. 2A through 2D, which illustrate certain steps involved in a specific embodiment for measuring fluids using the modular tester. Thus, in FIG. 2A, both valves are open and water is flushed through the test chamber of the pressure vessel 20 in preparation for the testing of fluids. Thereafter, both valves are closed and as shown in FIG. 2B, calibration fluid, such as distilled water, is sent to fill vessel 20 for NMR testing and recordation. NMR testing is performed on the calibration fluid in order to provide a point of reference for subsequent fluids to be tested. It will be appreciated that reference points obtained in this measurement are stored in a memory of computer 42. FIG. 2C illustrates the step of discharging the calibration fluid through the open lower valve after the calibration measurements have been taken. At this point, the apparatus is ready for testing of fluids within the borehole. FIG. 2D represents a sample fluid being taken through the open upper valve into vessel 20 for testing. Depending on the geometry of vessel 20 and the viscosity of the various fluids, one or both valves may be opened during the procedures of FIGS. 2C and 2D.

The method is preferably practiced using a two-pass technique. Thus, in a preferred embodiment, the first pass through the borehole may be performed using, for example, the MRIL® tool described above to obtain a fast log providing an indication of the petrophysical properties of the rock in the vicinity of the borehole. Following this stage, the complete log of the rock formation along the borehole may be used to identify target zones of interest for performing direct measurements. The measurements made in the first pass are well known in the art and need not be described in detail. The reader is directed to the disclosures of U.S. Pat. Nos. 4,710,713; 4,717,876; 4,717,877; 4,717,878; 5,212,447; 5,280,243; 5,309,098; 5,412,320; 5,517,115; 5,557,200; 5,696,448; 5,936,405; 6,005,389; 6,023,164; 6,051,973; 6,107,796 and 6,111,408 all of which are commonly owned by the assignee of the present application. Additional information is provided in U.S. Pat. Nos. 5,055,787 and 5,055,788. The content of the above patents is hereby incorporated by reference for all purposes.

Once the target zones have been identified, a second pass is preferably made using any one of the commercial downhole testers described above. Second pass measurements are typically made only in the target zones as a cost saving measure. The direct downhole NMR measurements using the modular tester are then performed as described below. Finally, the results of the NMR measurements are interpreted directly, and/or used to provide more accurate interpretation of the log obtained in the first pass.

In an alternative embodiment, provisions may be made for using the modular NMR tester to perform measurements during the drilling of the borehole, or as part of the first pass described above.

The downhole NMR tester is preferably used to provide measurements of one or more of the following parameters of the fluid samples: (a) hydrogen density, i.e., the number of hydrogen atoms per unit volume; (b) self-diffusivity (which is inversely related to the fluid viscosity); and (c) nuclear relaxation times $T_1$ and $T_2$ for different operating frequencies depending on the atomic elements of interest. Additional measurements may be made using the multiple-tuning capability of the tester for estimating, for example, carbon density, hydrogen-carbon coupling and/or obtaining polarization transfer information, and others.

Figure 4:
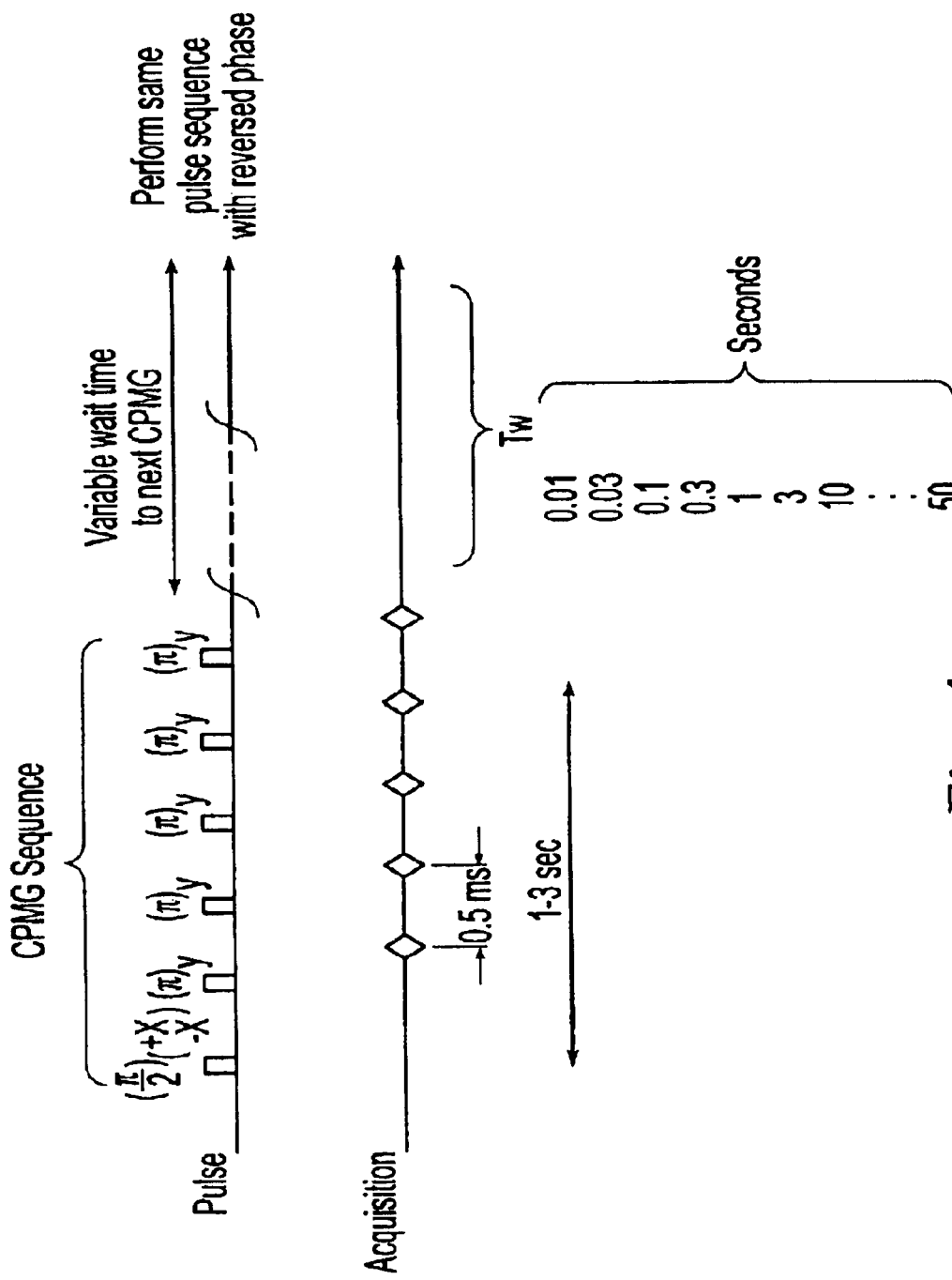
FIG. 4 illustrates one version of a pulse and echo acquisition sequence used for NMR fluid measurements.

In one embodiment of the operation of the NMR sensing system, the determination of the hydrogen index and the $T_1$ and $T_2$ relaxation times is based on CPMG pulse-echo trains having an echo spacing of approximately 0.5 milliseconds (ms) as shown in FIG. 4. Approximately 10,000 pulse signals may be generated and the corresponding echo signals may be digitized, stored and accumulated in a specific embodiment. The methods for parameter derivation using such NMR measurements are known in the art and need not be discussed in detail. In the specific application, however, it is necessary to determine certain operating parameters of the system.

For example, the echo acquisition time in a preferred embodiment is approximately 0.1 ms. Other times may also be used, if desired. Assuming an echo acquisition time of 0.1 ms, the maximum tolerable field distortion is then determined using the condition $T_2^* > 0.1$ ms, where $T_2^*$ is a time constant that characterizes the apparent NMR signal decay. By setting a lower limit for $T_2^*$ of 0.1 milliseconds, r.m.s. field distortions equivalent to 10 kHz or 0.5% of the main $B_0$ field are allowed.

It is important to realize that relaxation times of bulk fluids can be as high as 10 sec in reservoir conditions. To achieve an error of less than about 1% of the hydrogen index, measurements must be spaced out to about five times the relaxation times, i.e., to about 50 sec. Therefore, it would clearly be impractical to perform a large number of individual measurements in order to increase the signal SNR and only a few measurements must suffice to achieve the required signal SNR. In this regard, it is worth emphasizing that the SNR of the measured signals may be varied simply by changing the measurement volume of fluid in the test chamber. As noted above, this may be accomplished in the tester by expanding the chamber along its longitudinal axis, and correspondingly increasing the length of the permanent magnet. It has been estimated that for the illustrative embodiment discussed above wherein the test chamber contains 10 cm$^3$ of fluid, the single measurement SNR is approximately about 100:1.

The wait time between CPMG pulse-echo trains is preferably determined both by the longest $T_1$ measurements and by the requirements of the $T_1$ measurements. In a preferred embodiment, the wait times used by the tester may be set to 0.01, 0.03, 0.1, 0.3, 1.0, 3.0, 10.0 and 50.0 seconds, as shown in FIG. 4. Other wait time sequences may be used, if desired.

As known in the art, the hydrogen index of the fluid sample is determined by extrapolating the echo amplitudes from at least one phase-alternated CPMG pair to time equal to 0 ($\pi/2$ pulse). The ratio of this amplitude, compared to the amplitude given by the water reference, equals the relative hydrogen content of the sample fluid. It can be appreciated that by using the multi-tuning capability of the tester, additional measurements may be made for the presence of other atomic elements, such as $^{13}C$.

The $T_2$ relaxation parameter is determined in one embodiment of the operating procedure by transforming the time-domain echo data into a $T_2$ time distribution. The $T_1$ relaxation time is preferably determined by observing the effect of different wait times on the time equal to 0 ($\pi/2$ pulse) amplitude. The resultant recovery curve may be transformed into a $T_1$ time distribution, according to calculations known in the art.

Figure 5:
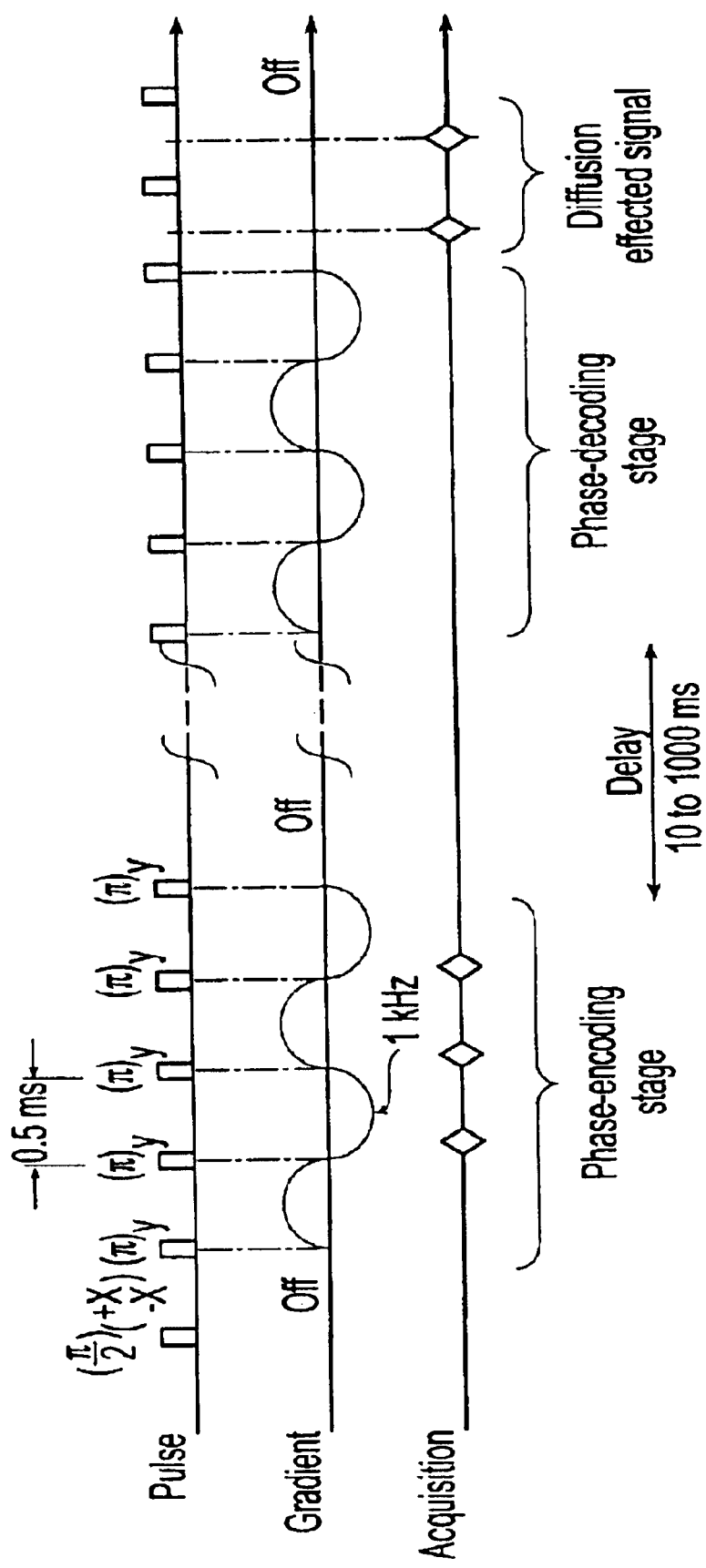
FIG. 5 shows one embodiment of a pulse sequence and a corresponding time function of the gradient field used for diffusion measurements.

The downhole NMR tester may further be used to provide diffusivity and viscosity measurements. Referring to FIG. 5, a field gradient is used in a preferred embodiment to perform these measurements. In particular, the field is used to overcome the background field variations using the following steps.

As shown in FIG. 5, a standard CPMG sequence is used with an echo spacing of about 0.5 milliseconds. This short echo spacing greatly attenuates the effects of the gradients arising from an imperfect magnetic field $B_0$. The actual echo spacing may be varied within some limits. In the beginning of the CPMG train, the gradient is turned on with a frequency corresponding to the selected echo spacing time for a few cycles. In the specific embodiment using 0.5 ms echo spacing, a gradient frequency of 1 kHz is used. The amplitude of the gradient field is relatively small compared with the static field and in a preferred embodiment is between a fraction of 1% to about a few percent of the strength of the $B_0$ field. As shown in FIG. 5, the gradient is phase-locked such that its zero-crossings coincide with the pulses being applied. This period is the phase-encoding stage. Next, the gradient is turned off for an evolution time of about 10 to 1000 ms. In a preferred embodiment, about 100 milliseconds evolution time is used during which time the hydrogen spins are free to diffuse within the measurement volume. After the evolution time, the gradient is turned on again at the select frequency, i.e., 1 kHz, but in a phase that undoes the effect of the phase-encoding stage. After this phase-decoding operation, CPMG echoes are acquired in the usual manner.

It can be appreciated that in the absence of diffusion (corresponding to high viscosity), the final signal is unaffected. Under diffusion, however, the signal attenuation is directly related to the rate of diffusion during the evolution time interval. Accordingly, the measurements of the downhole NMR tester may be used to estimate the self-diffusivity and thus the viscosity of the fluid directly.

In essence, the phase-encoding stage translates the position of the spins into a phase relationship. The phase-decoding stage does the same translation with a negative sign. If there has been a net change in the spin position between the encoding and the decoding stages, the result of applying the two stages will be a net change in the phase relationships that would lead to a reduction of the measured signal amplitude. Accordingly, it can be appreciated that the difference between measurements of the formation fluid with and without the encoding/decoding processing stages may be used to quantify diffusion in the fluid.

The time delay between the phase-encoding and the phase-decoding stages can preferably be varied in some systematic fashion, i.e., 10, 100 and 1000 ms, and changes in the signal amplitudes obtained in each measurement may be used to determine the self-diffusion coefficient of the fluid, as known in the art. In accordance with another embodiment of the operating procedure, a single strong pulse may be used in the encoding stage and another strong pulse with reverse polarity may be used in the decoding stage of the method.

It will be appreciated by those skilled in the art that the downhole NMR tester and the parameter measurements may be used in a number of different ways. For example, as noted above, the measurements may be used to enhance the interpretation of previously conducted log measurements of the borehole by supplying, essentially in real time, true values for connate oil and drilling mud filtrates under reservoir, i.e., raw conditions.

Further, those familiar with the operation of the commercial tester tools will appreciate that measurements may be extended in time, so as to provide a record of the fluid passing through the tester over a predetermined period. For example, as known, the sample probes inserted into the rock may pump fluid out of the rock for periods of about 5–10 minutes to 40 hours in some cases. Assuming that a single downhole NMR measurement takes about 1 minute to complete, in one hour the tester can provide 60 independent measurements that are immediately available to the operator. By contrast, a single prior art NMR measurement of a sample taken to the surface may take days to complete. It will be appreciated that to preserve the accuracy of the measurement the test chamber of the vessel 20 may be flushed between measurements, as shown in FIG. 2A. Re-calibration of the tool may be performed in accordance with a pre-determined schedule, for example every two hours.

Although the present invention has been described in connection with the preferred embodiments, it is not intended to be limited to the specific form set forth herein, but on the contrary, it is intended to cover such modifications, alternatives, and equivalents as may be reasonably included within the spirit and scope of the invention as defined by the following claims.

What is claimed is:

1. An apparatus for generating a temperature-stabilized magnetic field for conducting nuclear magnetic resonance (NMR) measurements, the apparatus comprising:

a first magnet with a first magnetization in a direction z; and a second magnet with a second magnetization in the direction z;

wherein the first and second magnets have magnetic temperature coefficients of opposite signs to produce a temperature-stabilized magnetic field $B_0$ in an area of interest and wherein the cross-section of the first and second magnets has a ratio that is proportional to the ratio of the inverse of the respective temperature coefficients of the materials from which the first and second magnets are made.

2. The apparatus of claim 1, wherein the selected temperature range is between about 0° C. and 175° C.

3. The apparatus of claim 1, wherein the first and second magnets generate a combined magnetic field in the test region with a strength between 100 and 10,000 Gauss.

4. The apparatus of claim 1, wherein the first magnet comprises a samarium-cobalt alloy and the second magnet comprises a neodymium-iron-boron alloy.

5. The apparatus of claim 1, wherein the second magnet is a concentrically disposed tubular magnet enclosing the first permanent magnet material.

6. The apparatus of claim 1, wherein the direction of magnetization of the first and second permanent magnets is uniform around their circumference.

7. The apparatus of claim 1, wherein the first and second magnets comprise segments of permanent magnet material arranged around a substantially cylindrical interior volume.

8. The apparatus of claim 1, further comprising a tubular pressure barrel disposed around the first and second magnets.

* * * * *